United States Patent [19]

Shibata et al.

[11] Patent Number: 4,739,144
[45] Date of Patent: Apr. 19, 1988

[54] WIRE ELECTRODE DISCHARGE MACHINING WITH NOZZLE GAP CONTROL

[75] Inventors: Yoshio Shibata; Masato Banzai; Haruhiko Ito, all of Aichi, Japan

[73] Assignee: Mitsubishi Denki Kabushiki Kaisha, Tokyo, Japan

[21] Appl. No.: 909,354

[22] Filed: Sep. 19, 1986

[30] Foreign Application Priority Data

Sep. 20, 1985 [JP] Japan ............... 60-207854

[51] Int. Cl.⁴ ............................................. B23H 7/02
[52] U.S. Cl. .................... 219/69 W; 204/206; 219/69 D
[58] Field of Search ............. 219/69 W, 69 D, 69 M; 204/224 M, 206

[56] References Cited

U.S. PATENT DOCUMENTS

| | | | |
|---|---|---|---|
| 4,481,095 | 11/1984 | Inoue | 204/224 M |
| 4,539,459 | 9/1985 | Yamagata | 219/69 W |
| 4,559,433 | 12/1985 | Aramaki et al. | 219/69 W |
| 4,564,431 | 1/1986 | Miyano | 219/69 W |
| 4,581,513 | 4/1986 | Obara et al. | 219/69 D |
| 4,607,149 | 8/1986 | Inoue | 219/69 D |
| 4,628,172 | 12/1986 | Inoue | 219/69 W |

Primary Examiner—A. D. Pellinen
Assistant Examiner—Geoffrey S. Evans
Attorney, Agent, or Firm—Sughrue, Mion, Zinn, Macpeak and Seas

[57] ABSTRACT

The gap width g between a workpiece 12 and the outlet of a nozzle 7, 8 is automatically and continuously controlled in accordance with a predetermined configuration of a groove 15 being machined to facilitate the exhaust of injected machining liquid 10 and entrained dust particles 14 from the groove.

3 Claims, 4 Drawing Sheets

U.S. Patent    Apr. 19, 1988    Sheet 1 of 4    4,739,144
FIG. 1
PRIOR ART
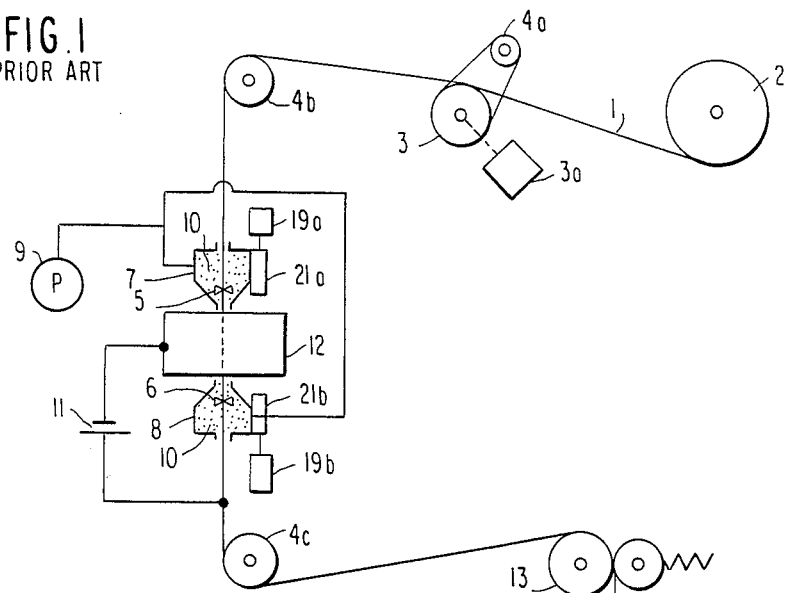
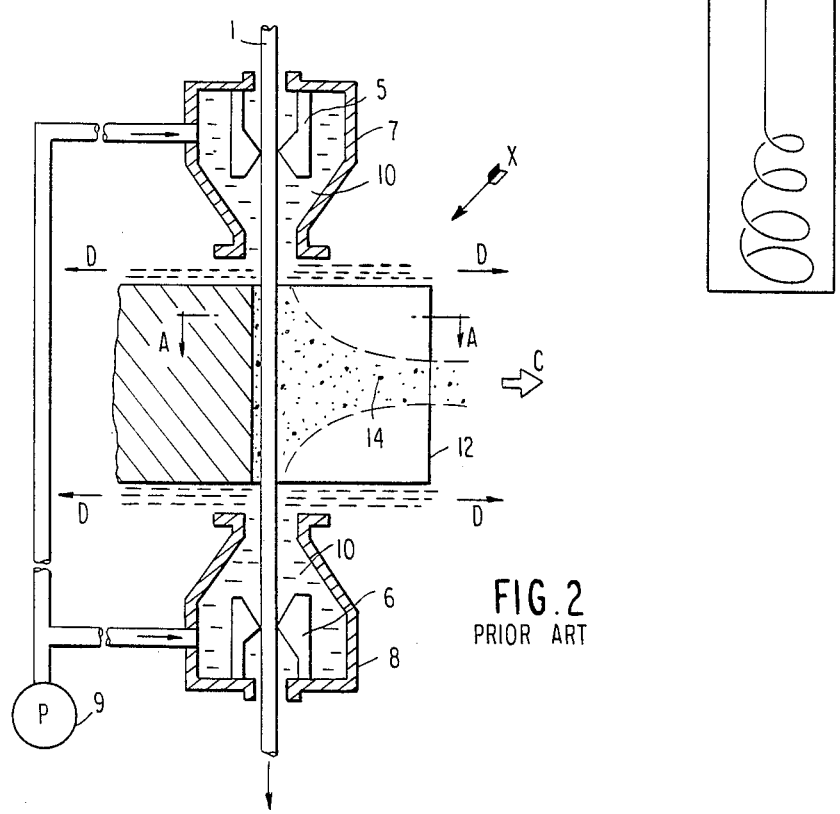
FIG. 2
PRIOR ART

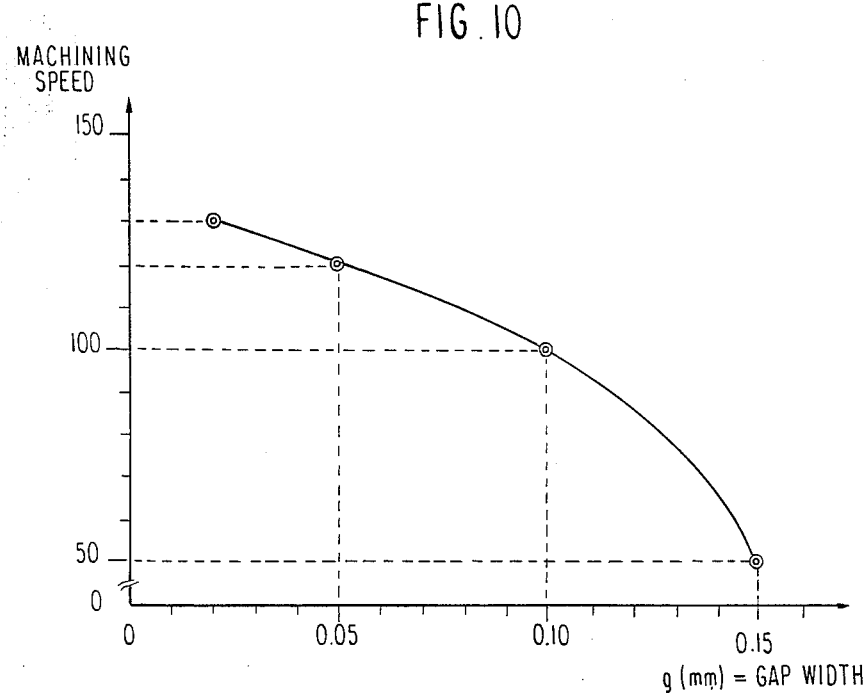
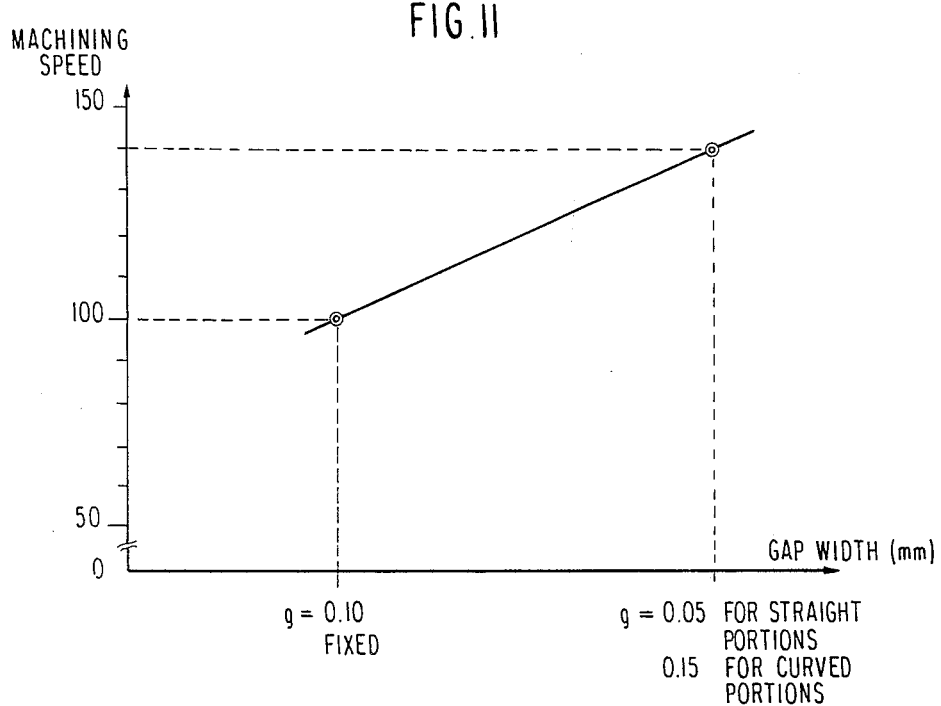

WIRE ELECTRODE DISCHARGE MACHINING WITH NOZZLE GAP CONTROL

BACKGROUND OF THE INVENTION

This invention relates in general to an apparatus for machining a workpiece by electro-erosion using a wire fed through a machining zone of the workpiece, and more specifically to an apparatus for controlling the gap between the workpiece and the outlet of a nozzle(s) delivering a machining liquid to the workpiece in accordance with the length and configuration of the groove being machined.

In such an apparatus the wire electrode is fed at a predetermined longitudinal velocity to compensate for the wear of the electrode, while being transversely displaced relative to the workpiece. The displacement between the wire electrode and the workpiece is generally effected automatically by a servo system under the control of programmed instructions defining a predetermined machining path.

In the conventional wire electrode discharge machining apparatus shown in FIGS. 1 through 4, reference numeral 1 designates a wire electrode supplied from a bobbin 2, 3 is a brake roller directly coupled to an electromagnetic brake actuator 3a to impart a predetermined tension to the wire electrode, and 4a, 4b and 4c are idlers for controlling the feed direction of the wire electrode. The wire electrode is wound around the brake roller 3 and the idler 4a, and the current applied to a coil of the brake actuator 3a maintains the wire electrode at a predetermined tension.

Upper and lower guides 5, 6 for the wire electrode are respectively disposed in upper and lower nozzles 7, 8 which deliver a machining liquid 10 under pressure to the upper and lower sides of a workpiece 12. A pump 9 supplies the machining liquid to the nozzles. The wire electrode 1 is supported by the upper and lower guides 5, 6, and extends through the workpiece 12 in a predetermined direction. A power supply 11 generates a periodic or pulsating discharge signal which is applied between the wire electrode and the workpiece. A pair of driven pinch rollers 13 wind in the exiting electrode wire at a predetermined velocity and deliver it to a catch bin. Reference numeral 14 designates machining particles or dusts which are melted and dispersed from the workpiece 12, and 15 is the groove being machined in the workpiece.

In such an apparatus the gap between the workpiece 12 and the outlets of the nozzles 7, 8 is initially adjusted or set by manually controlled servo motors 19a, 19b which drive frame members 21a, 21b fitted to the nozzles. Such gap is set at a predetermined width by adjusting both of the nozzles, or by adjusting one of them with the other one being fixed, and remains at such width throughout the machining operation. After this initial gap setting the power supply 11 is actuated to deliver a pulse voltage between the wire electrode and the workpiece, which in cooperation with the machining liquid 10 supplied from each nozzle coaxially with the electrode, machines the desired groove 15. The machining dust 14 which is melted and dispersed from the workpiece 12 by the heat energy of the periodic electrical discharges is exhausted to the outside through the groove 15 along with a stream of machining liquid 10, as shown in FIGS. 2 and 4. The machining liquid delivered from the nozzles divides into two streams, one stream C (arrow, FIG. 2) flowing through the groove 15, and another stream D striking the surface of the workpiece and dispersing.

The displacement between the wire electrode 1 and the workpiece 12, in order to maintain a small working gap between the electrode and the workpiece as shown in FIG. 3, is generally effected automatically by moving an X-Y table (not shown) via a servo system in accordance with programmed instructions in a numerical controller (conventional and not shown). The grooves 15 are thus machined continuously and in desired configurations by repeating the electrical discharges and appropriately controlling the X-Y table.

When the groove 15 being machined is straight as shown in FIGS. 3 and 4 and its rear side is open, the machining dust 14 is effectively entrained by and exhausted along with the liquid 10. When the rear side of the groove is closed, however, as shown at 15a in FIG. 5(a), or when the groove has a lateral arm 15b as shown in FIG. 5(b), the exhaust of the liquid 10 and machining dust 14 is impeded or even blocked. When the nozzle outlets do not completely cover or overlie the entire length of a "dead end" groove the machining liquid and dust can escape or exit from the exposed upper and lower portions of the groove, but when the groove is fully covered by the nozzles, such as at the beginning of the machining operation or at a right angle bend of the groove configuration, such exhaust is substantially blocked. This leads to machining inaccuracies and increased electrode wire consumption. Similar problems are encountered when the groove is sharply curved or spiralled as shown in FIGS. 5(c) and 5(d).

SUMMARY OF THE INVENTION

This invention avoids the above mentioned problems by providing a wire electrode discharge machining apparatus in which the gap width between the workpiece and the nozzle outlet is continuously and automatically controlled in accordance with the predetermined configuration of the groove being machined to thereby facilitate the outflow or exhaust of the injected machining liquid and entrained dust particles.

BRIEF DESCRIPTION OF THE DRAWINGS

FIG. 1 is a diagrammatic view of a conventional wire electrode discharge machining apparatus;

FIG. 2 is an enlarged sectional view of a portion of FIG. 1;

FIG. 10 is a characteristic diagram plotting the gap length between the nozzle and the workpiece vs. the machining speed; and Fig. 11 is a characteristic diagram comparing the machining speed of the invention with that of a conventional apparatus.

DETAILED DESCRIPTION OF THE PREFERRED EMBODIMENTS

Figure 3:
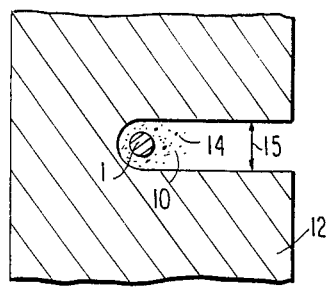
FIG. 3 is a sectional view taken along line A—A of FIG. 2.
Figure 4:
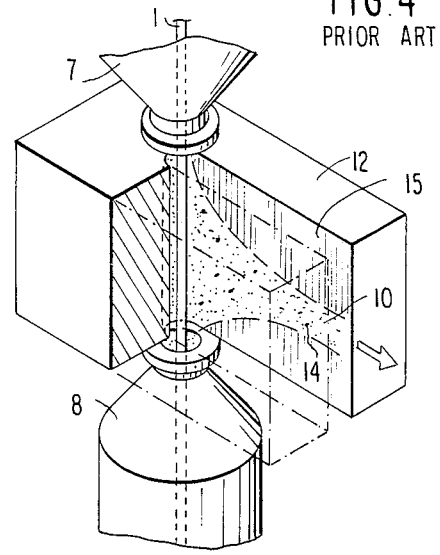
FIG. 4 is a perspective view, in partial cutaway, taken in the direction of arrow X in FIG. 2.
Figure 5A:
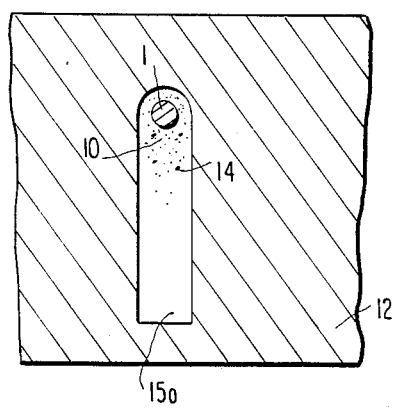
FIGS. 5(a) to 5(d) are sectional views showing different machining groove configurations.
Figure 5B:
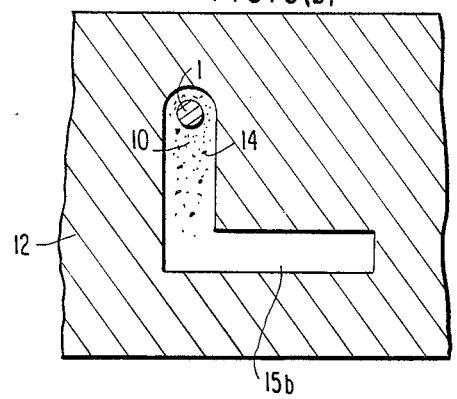
Figure 5C:
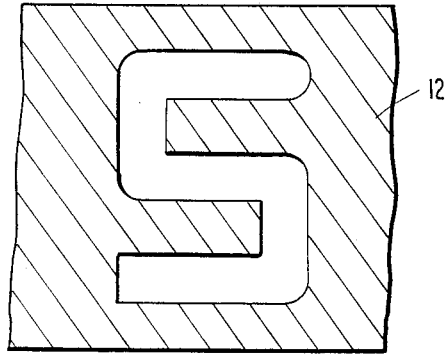
Figure 5D:
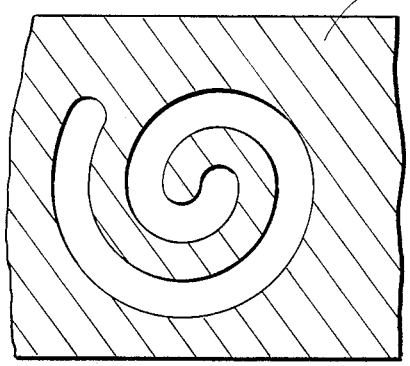
Figure 6:
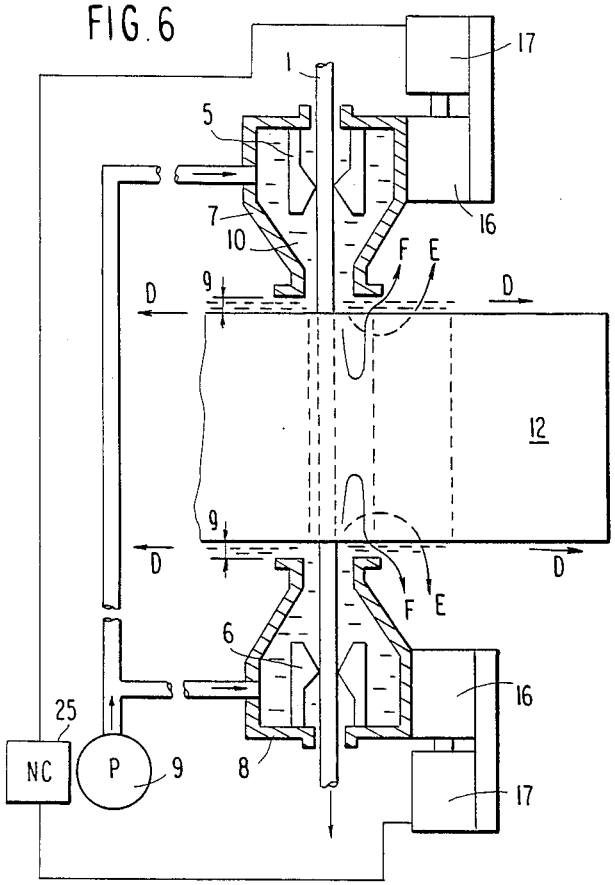
FIG. 6 is a sectional view of an embodiment of the present invention.
Figure 7:
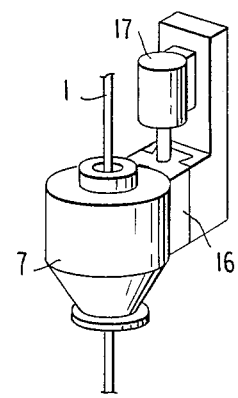
FIG. 7 is a perspective view of the upper nozzle arrangement shown in FIG. 6.

FIGS. 6 and 7 illustrate a wire electrode discharge machining apparatus constructed according to a preferred embodiment of the present invention, wherein each nozzle 7, 8 is attached to a plate 16 slidably mounted to and driven by an actuator 17. Reference characters E and F are streams of the machining liquid 10, and g is the width of the gap between the workpiece 12 and nozzles 7, 8. In FIGS. 6 and 7 the same or similar components to those shown in FIG. 2 are depicted by the same reference numerals, and the description of these components is omitted for simplification.

In this embodiment of the invention, at the time of setting up the machining operation a variable gap width g between the workpiece 12 and the nozzles 7, 8 is into or recorded on the tape of the numerical controller 25 in accordance with the configuration of the groove to be machined, together with instructions specifying the displacement of the X-Y table, the electrical discharge rate and magnitude, and the delivery rate of the machining liquid. The upper and lower gap widths g are thus continuously and automatically controlled by the actuators 17 in accordance with the tape data of the numerical controller 25 such that, for example, when the groove 15 being machined is straight and its rear side is open the gap widths are maintained at about 0.05 mm, whereas when the groove has a closed end or a bent-/curved configuration as shown in FIGS. 5(a) to 5(d) the gap widths are increased to between about 0.1 to 0.15 mm. In such increased width situations the machining speed is also slightly reduced to afford additional time for the outflow/exhaust of the liquid 10 and dust 14, which attendantly avoids the breakage of the wire electrode and reduces its consumption rate.

With such an automatic gap control mode of operation, when the nozzle outlets do not completely cover the machining groove the liquid 10 and entrained dust 14 flow out through upper and lower streams E as shown in FIG. 6. When the groove is fully covered by the nozzles, however, the gap widths are automatically increased as described above and the machining liquid 10 together with the dust 14 form outlet streams F through the widened gaps.

Figure 8:
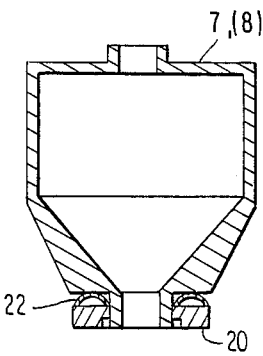
FIG. 8 is a sectional view of a nozzle according to another embodiment of the invention.

FIG. 8 shows an alternate embodiment wherein the gap width determining nozzle outlet flange(s) 20 is configured as a separate element vertically slidable on the nozzle mouth, and its position is determined by an interposed annular leaf spring 22. When the nozzle(s) covers the entire machining groove 15, the increased reaction force of the exiting machining liquid 10 compresses the spring(s) 22 to automatically widen the gap(s) g.

Figure 9A:
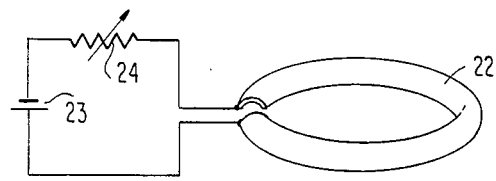
FIG. 9(a) is a perspective view of a portion of the nozzle shown in FIG. 8, according to a further embodiment.
Figure 9B:
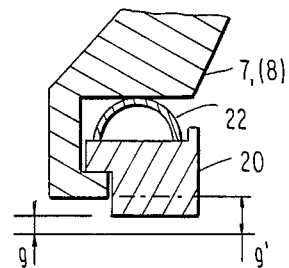
FIG. 9(b) is a sectional view of the nozzle portion in FIG. 9(a)

FIG. 9(a) shows a further embodiment wherein the expansion and contraction of the leaf spring 22 is thermally controlled by a variable current supplied from a source 23 to appropriately adjust the gap width within the range of g to g', as shown in FIG. 9(b). The current varying resistor 24 is automatically set by the numerical controller. A "memory" alloy which automatically returns to a prior configuration is also usable in place of the leaf spring 22 in FIGS. 9(a) and 9(b).

Since the apparatus of the present invention automatically controls and maintains the gap between the workpiece and the nozzles at an optimum width by moving the nozzles in accordance with the configuration of the groove being machined, the exhaust of the injected machining liquid and entrained dust from the groove becomes considerably smoother and the breakage of the wire electrode is reduced. In addition, since the shorter the gap width the faster the machining speed as shown in FIG. 10, the overall machining speed is increased by minimizing the gap for straight, open ended portions of the groove as shown in FIG. 11.

What is claimed is:

1. A wire electrode discharge machining apparatus, comprising:
    (a) a wire electrode (1) adapted for relative movement with respect to a workpiece (12);
    (b) an upper nozzle (7) disposed above said workpiece and surrounding said electrode;
    (c) a lower nozzle (8) disposed below said workpiece and surrounding said electrode;
    (d) a power source (11) for applying a machining voltage between said workpiece and said electrode;
    (e) a machining liquid (10) delivered under pressure toward said workpiece from said upper and/or lower nozzles; and
    (f) means for automatically and continuously controlling the width of upper and lower gaps (g) individually defined between said workpiece and outlets of said upper and lower nozzles by vertically moving said nozzle outlets in accordance with a predetermined configuration of a groove (15) being machined in said workpiece to facilitate the exhaust of the machining liquid and entrained machining dust (14) from the groove, wherein:
    (1) said gap widths are decreased when machining a straight groove having an open rear side and are increased when machining a straight groove having a closed rear side, a bent groove or a curved groove,
    (2) the controlling means comprises drive actuators (17) individually coupled to the upper and lower nozzles, and
    (3) the actuators are directly controlled by a numerical controller which executes a stored program specifying the groove configuration.

2. An apparatus according to claim 1, wherein actuator drive plates (16) are attached to the upper and/or lower nozzle and slidably mounted on the actuators.

3. An apparatus according to claim 1, wherein the controlling means adjusts the gap width between the workpiece and the nozzle outlet within a range of about 0.05 to 0.15 mm.

* * * * *